United States Patent [19]
Baer

[11] Patent Number: 4,654,700
[45] Date of Patent: Mar. 31, 1987

[54] OPTICAL DECODER

[75] Inventor: Ralph H. Baer, Manchester, N.H.

[73] Assignee: Sanders Associates, Inc., Nashua, N.H.

[21] Appl. No.: 718,679

[22] Filed: Apr. 1, 1985

[51] Int. Cl.⁴ .............................................. H04N 7/00
[52] U.S. Cl. ..................................... 358/93; 340/707; 434/323; 273/DIG. 28
[58] Field of Search .................. 358/93; 340/707, 708, 340/712; 434/362, 323, 327, 350; 273/DIG. 28

[56] References Cited
U.S. PATENT DOCUMENTS 3,737,566  6/1973  Baer et al. ............................. 358/93
3,993,861  11/1976  Baer ..................................... 358/142
4,329,684  5/1982  Monteath et al. .................. 340/707

Primary Examiner—James J. Groody
Assistant Examiner—John K. Peng
Attorney, Agent, or Firm—Louis Etlinger; Richard I. Seligman

[57] ABSTRACT

An optical decoder to permit differentiating between at least two flashing spots displayed on a cathode ray tube screen is provided by a photosensor and an electrical circuit which is responsive to the absence of flashes during a flashing sequence which is different for the two spots and not distinguishable by the naked eye.

19 Claims, 8 Drawing Figures

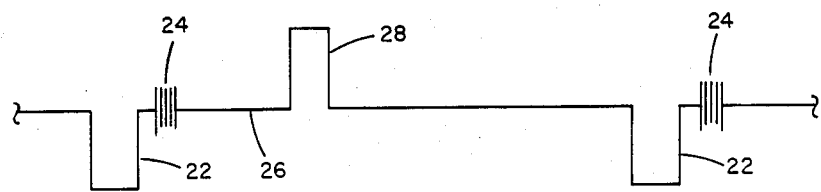
FIG. 2
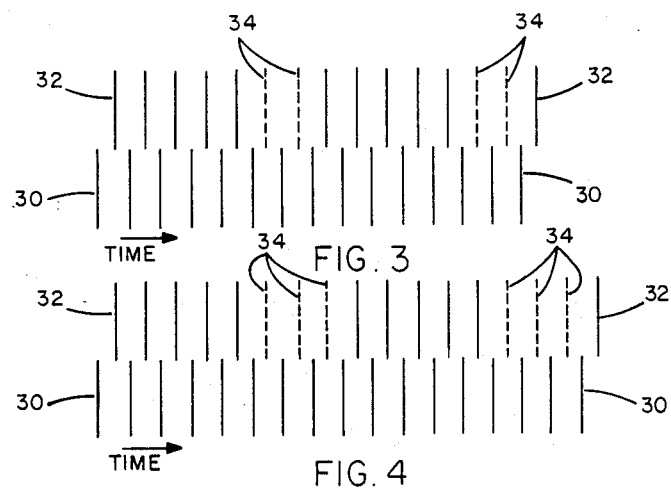
FIG. 3
FIG. 4
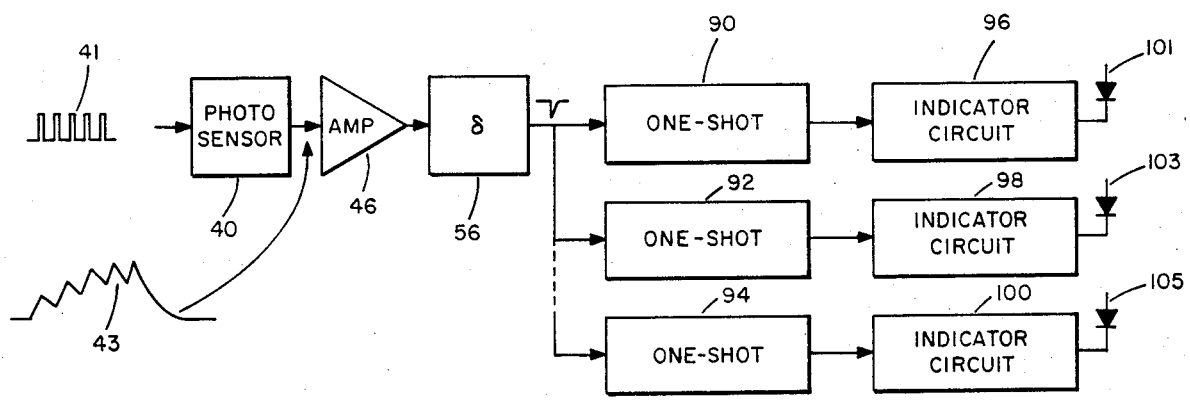
FIG. 6

OPTICAL DECODER

BACKGROUND OF THE INVENTION

This invention relates to optical decoders and, more particularly, to the optical decoding of information from the screen of a television receiver, monitor, or other display.

Considerable attention is being given to the use of television assistance as an education and training tool. In such uses, it often is desirable to present various information to the user/viewer whereby he can make a choice. For example, in a testing situation it is often desirable to present a question to the user and have him select one of a plurality of possible answers. The same application is, of course, useful for entertainment as the television industry has made quizzes an important form of entertainment for the public.

In my U.S. Pat. No. 3,737,566 for a "Television Coder and Decoder", I describe apparatus for decoding information from the screen of a television receiver. The decoding consists of determining which one of a plurality of displayed coded spots on a television receiver screen is the correct answer to, for example, a question. A number of coded spots are presented on the television screen and the correct answer is coded differently from the incorrect answers. In the coding scheme of this patent, one of the spots, the correct answer, would be coded to flash an even number of times while all the rest would be coded to flash an odd number of times, or vice versa. The decoder detects this difference. While this system works very well, it does require that the user put his optical decoding device, photosensor, on the correct spot prior to its starting to flash so that the decoder will be able to determine whether it flashed an even or odd number of times. This can be problemsome since there are many instances where it is desirable to have the spot selected after the flashing has begun and not necessarily requiring the decoder to be put next to the spot prior to the flashing.

In my U.S. Pat. No. 3,993,861 for a "Digital Video Modulation and Demodulation System", I describe a system for providing digital data via a flashing spot which allows significantly more data to be presented over the odd/even data presented in the system of U.S. Pat. No. 3,737,566, however, also in this case it is necessary that the user place his lightpen on the flashing spot prior to its beginning to flash in order to obtain the entire message.

Both of these systems suffer from the limitation that the photosensor must be in place and facing the spots on the CRT before the encoded sequence of light spots start flashing. Doing otherwise would result in missing the beginning of a coded sequence. To preclude this problem, the coded sequence could be repeated and start and stop data be provided to enable the sensor unit to know when the beginning of a code sequence has occurred. Of course, this requires circuitry to recognize start and stop codes. This has been done in applications of the teachings of said U.S. Pat. No. 3,993,861, but it is not an optimum solution to the problem for certain applications, such as those requiring very inexpensive decoders.

Accordingly, it is an object of this invention to provide an improved optical decoder for displays.

It is another object of this invention to provide a decoder which will permit decoding of light spots displayed on the face of a display notwithstanding that the photosensor is placed on the display screen after spot transmission is in progress.

It is a further object of this invention to provide an improved simple decoder which can distinguish between two or more differing codes which will not be distinguishable by the naked eye.

SUMMARY OF THE INVENTION

Briefly, in accordance with one embodiment of the invention, two different codes are employed to indicate a "yes" response and a "no" response. For a "yes" response, a spot is displayed and caused to flash in a predetermined sequence. For example, the spot will flash five times (once per field for five consecutive fields) and then cease flashing for three fields. This sequence is continuously repeated. For a "no" response, the spot will also flash five times (once per field for five consecutive fields) but then cease flashing for only two fields. This sequence is also continuously repeated. Decoding of the spots is thus achieved by determining how many fields occurred where there was no spot displayed (flashed), i.e. "yes" and "no" code sequences are distinguishable by virtue of the relative lengths of the "gaps" in their transmission. Clearly, this difference in code (three versus two) would not be discernible to the naked eye but could be readily decoded using a photosensor.

With this type of coding, a decoder is readily configured so that no matter when in the repeated sequence of flashes the decoder is placed against the flashing spot, it can determine that either two or three fields have occurred with no flashes after detection of a predetermined number of flashes (five, for example).

BRIEF DESCRIPTION OF THE DRAWINGS

The above-mentioned and other features and objects of this invention will become more apparent by reference to the following description, taken in conjunction with the accompanying drawings, in which:

FIG. 2 is a typical television waveform in accordance with the principles of this invention;

FIG. 3 is an expanded waveform like that of FIG. 2 showing the transmission for one typical coded spot;

FIG. 4 is another expanded waveform like that of FIG. 2 showing the transmission for a different coded spot;

FIG. 6 is a block diagram of a decoder capable of differentiating between many codes;

DESCRIPTION OF PREFERRED EMBODIMENTS

Figure 1:
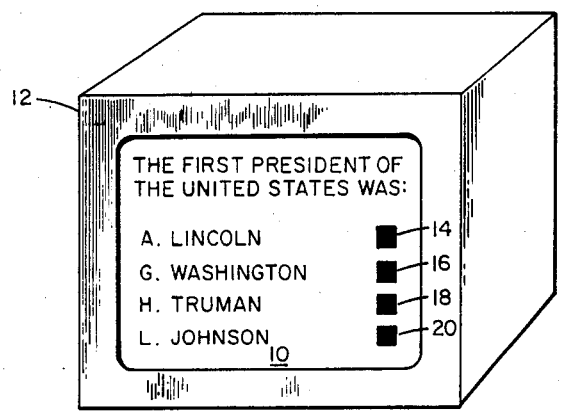
FIG. 1 is a drawing illustrating a television cathode ray tube screen employed in a coded information mode.

Referring now to FIG. 1 of the drawings, there is illustrated thereby one application of the invention namely a multiple choice quiz which is presented to a user/viewer on the screen 10 of a television receiver 12. At the top of the screen, a question is displayed to the viewer and below the question are displayed four multiple choice answers. Adjacent to the four multiple choice answers are four bright white or colored spots, 14, 16, 18 and 20. These spots are coded in accordance with the principles of the invention so that a user by placing a lightpen adjacent one of the spots makes his choice of the answer to the question. If the user placed the lightpen adjacent spot 16, he will receive an indication from the decoder attached to the lightpen that he had, in fact, selected the right answer. On the other hand, if he had placed his lightpen or photosensor adjacent any of the spots 14, 18 or 20, the decoder would indicate to the viewer that he had selected an incorrect answer.

Referring now to FIG. 2 of the drawings, there is illustrated thereby a waveform depicting the signal for generating the coded spots during a typical horizontal video scan line period. This waveform comprises a horizontal sychronization pulse 22 followed by a colorburst (3.58 MHz) signal 24 which rests on a black level line 26 as is conventional. Following the colorburst is a pulse 28 which will represent a bright narrow horizontal line segment which will appear on the screen 10 of television receiver 12. This pulse is followed by another horizontal synchronization pulse 22 colorburst 24 and additional pulses 28. During one field, a predetermined number of the pulses 28 are generated to display any of the spots 14, 16, 18 and 20. Typically, ten such pulses 28 are generated during each field so that 10 line segments of the television raster can illuminated to generate either of the spots 14, 16, 18 and 20.

The present invention makes use of transmission of clusters of such pulses 28 in groups of P groups followed by spaces in groups of S groups where S=2, 3, 4, or more. Each cluster of pulses 28 represents one of the spots 14, 16, 18, 20 on the screen 10 of television receiver 12.

The waveform of FIG. 3 represents the group of pulses to generate the spots 14, 18 and 20, that is to say, the incorrect answers. The bottom portion of the waveform, lines 30, represents vertical synchronization pulses while the illustration above the vertical synchronization pulses represents the clusters of pulses 28 generated in each field. As shown by this illustration, five pulse groups 32 are generated, each made up of ten pulses 28 in each field. After the generation of the five pulse groups, two fields are displayed in which no clusters of pulses are generated (pulse group spaces or "gaps") so that no spots are generated during these two fields. After the two blank fields for either of the spots 14, 18 and 20, five additional clusters of pulses 28 are generated again followed by two fields where these spots are not generated. Thus, as shown by FIG. 3, spots 14, 18 and 20 will flash five times, i.e. once per field for five consecutive fields. For the next two fields, the spots will not flash. They will then flash five times again, and for the following two fields again will not flash. This is repeated as long as desired.

The fourth spot 16, representing the correct answer, is generated very much in the same manner as described above but as illustrated in FIG. 4. For this spot the number of fields where no spots are generated, as represented by numerical lines 34, are three rather than two. Thus, the correct answer spot 16 comprises five pulse groups 32 (one per field) followed by three fields where no spots are generated, then followed by the generation of five flashing spots, one per field, followed again by three fields where no spots are generated, etc.. It should be understood, however, that the number of pulse groups 32 and the number of fields where no pulse groups 32 are generated are only typical and other number may be used instead. The only requirement is that the number of fields where pulse groups are not generated must be different for correct and incorrect answers, i.e. the gap lengths must be different.

Obviously, a photosensor can be positioned over any of the spots 14, 16, 18, and 20 at any time during the generation thereof and this detector will be able to determine the number of missing fields after the detection of five flashing spots. The photosensor must have a relatively slow time constant so as not to distinguish each line segment of the ten line segment spots, but rather integrate them so that each pulse group 32 results in one composite pulse from the photodetector.

Figure 5:
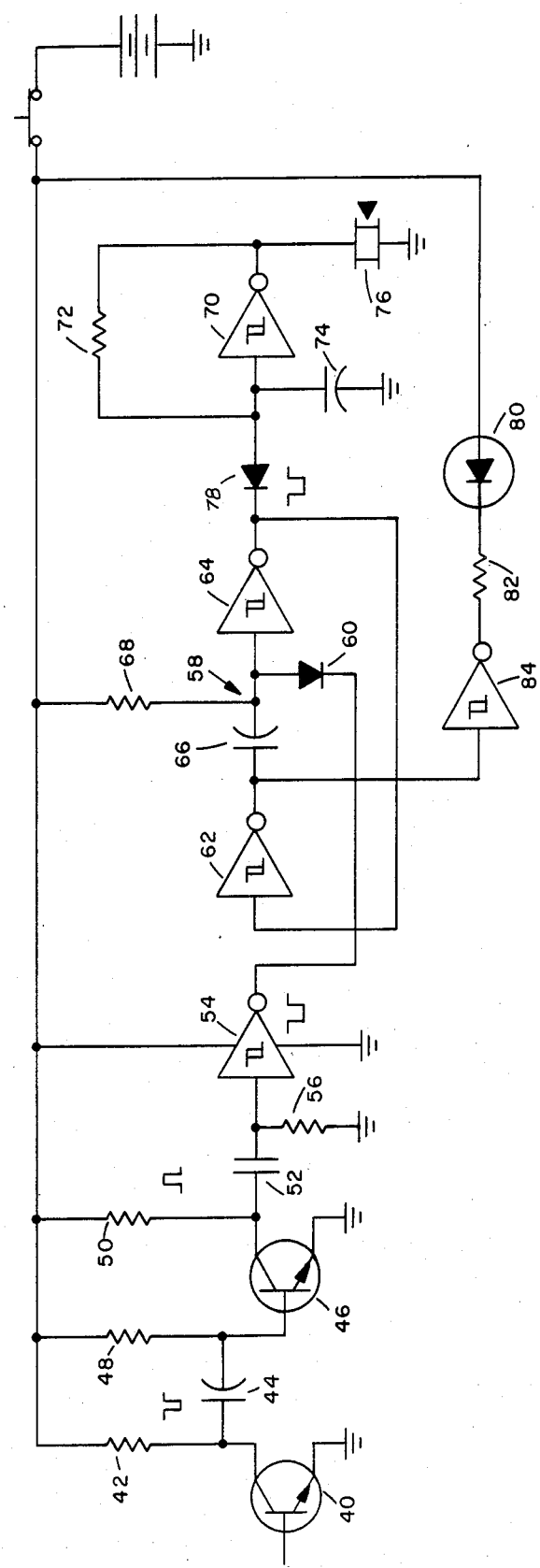
FIG. 5 is a schematic diagram of a decoder capable of differentiating between the two codes of FIG. 3 and FIG. 4.

Referring now to FIG. 5 of the drawings, there is illustrated thereby one embodiment of a circuit selectively responsive to the pulse group gaps. The circuit comprises a phototransistor 40 which is placed by the user next to (over) one of the spots 14, 16, 18, and 20 on the screen 10 of television receiver 12 so as to view the coded spot. Each flash of a spot incident on the phototransistor 40 will produce a negative going pulse across a resistor 42. These pulses are coupled via a capacitor 44 to the base of an NPN transistor 46. The collector current of transistor 46 is near saturation in the absence of an input signal by virtue of the low value of its base resistor 48. Therefore, upon detection of signals from a displayed spot, a positive going pulse will be developed across resistor 50.

This positive going signal across resistor 50 is coupled via a capacitor 52 to the input of a Schmitt trigger circuit 54 such as a common CMOS IC 74C14 Hex Schmitt device. The RC combination of capacitor 52 and a resistor 56 and Schmitt trigger 54 constitutes one half of a standard one-shot whose output pulse is a negative going pulse with the width approximately equal to 1/RC where R is the value of resistor 56 and C is the value of capacitor 52. This pulse from the Schmitt trigger 54 is typically designed to be on the order of a millisecond and occurs at a 59.94 Hz rate for U.S. NTSC color television signal environments. This pulse is applied to a one-shot 58 via a diode 60. The one-shot 58 includes Schmitt trigger inverters 62 and 64, a capacitor 66 and a resistor 68. This is a common retriggerable one-shot whose output is normally "low" and which goes "high" upon receipt of a negative input trigger signal, such as the pulse from the Schmitt trigger inverter 54. When this pulse arrives, the one-shot starts and times out a period of 1/RC seconds where R is the resistive value of resistor 68 and C the capacitive value of capacitor 66.

If this RC time constant is chosen so that the one-shot 58 is timed to keep its output "high" (stay "on") for a period equal to 3½ interpulse periods then a pulse group sequence such as that of FIG. 3 will keep the one-shot continually "high" since it never times out before another pulse turns it on. When the output of the one-shot stays "high" continuously, it indicates that a (light) spot has been "viewed" which represents a "false" answer.

If, however, spots are "viewed" on the television receiver screen that correspond to the sequence of FIG. 4, then the 3½ interpulse period passes in the absence of new "retriggering" pulses and one-shot 58 will go "low", that is times out normally. The one-shot then gets retriggered by the next pulse group. Hence, the one-shot output stays "low" only for the period of time between time out and the beginning of the next trigger pulse. Thus, the one-shot 58 output itself produces a negative going pulse once every five pulse groups. This constitutes a signal representing a "true" or "correct" spot.

Also shown in FIG. 5 is one of many ways in which this "true" pulse signal can be used to provide visual and/or oral indications to the viewer that he indeed placed his sensor unit so as to view a "true" answer spot. A Schmitt trigger inverter 70 combines with a resistor 72 and capacitor 74 to form a standard square wave oscillator circuit. When allowed to function, this circuit produces a rail-to-rail waveform suitable for driving a piezoceramic/beeper/speaker unit 76. This circuit is connected to one-shot 58 via a diode 78. Note that this diode is back-biased whenever the output of one-shot 58 goes "high"; hence, "false" responses (during which this condition obtains) results in a sustained beep from speaker 76. However "true" responses result in periodic quenching of this oscillator since every time one-shot 58 goes "low", so does the cathode of diode 78, causing it to conduct and prevent the "beeper" oscillator from functioning. The result is a stacatto interruption of the beeping tone which gives the viewer an immediate audible "correct" response.

The circuit also includes a light emitting diode 80 which is driven to an interrupted, flashing "on" state via a resistor 82 whenever the input to a Schmitt trigger inverter 84 is driven by the positive going pulse output of the Schmitt trigger inverter 62 of one-shot 58 during "true" conditions. Conversely, "false" spots cause the output of Schmidt trigger inverter 62 output to stay "low", hence, the output of Schmidt trigger inverter 84 stays high causing the light emitting diode 80 to remain dark.

Therefore, both a distinct audible and visual indication is instantly supplied to the viewer informing him as to whether he has pointed a sensor unit at a "true" or "false" spot.

Referring now to FIG. 6 of the drawings, there is illustrated thereby a block diagram of a system which extends the capability of the system shown schematically in FIG. 5. As can be seen, this system comprises a photosensor 40, its optical input pulse 41, its electrical output pulse 43, amplifier 46, narrow pulse generator/differentiator 54 all of the type described hereinbefore with reference to FIG. 5. However, additional triggered one-shot multivibrators 90, 92 . . . 94 are employed as are additional indicator circuits 96, 98 . . . 100. By increasing the number of pulse groups suppressed (not transmitted) beyond the two or three shown in FIGS. 3 and 4, and setting the delays of one-shots 90, 92 . . . 94 equal to 3.5, 4.5, 5.5, etc., pulse periods, indicator circuits 96, 98 . . . 100 and LED indicators 101, 103 . . . 105 will successively be activated. This will allow greater variety than simple true/false code transmission.

There are many ways to generate spots like spots 14, 16, 18 and 20 of FIG. 1 which will be readily apparent to one skilled in the art. One way is to utilize a simple computer program running, for example, on a personal computer. One program to do this is shown by the flow chart of FIG. 7 which is explained in conjunction with the sketch of FIG. 8.

Figure 8:
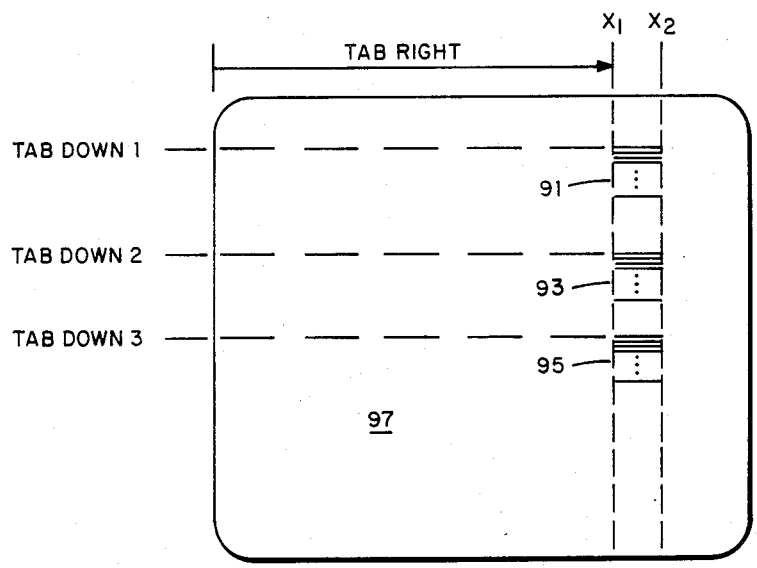
FIG. 8 is a sketch explaining the flow chart of FIG. 7.

As shown in FIG. 8, the object of the program is to generate three visible spots 91, 93 and 95 on a raster scan display screen 97. Each of these spots has a width of $(x_2-x_1)$ and a height of ten scan lines. Each spot is located at TAB RIGHT. In this example spots 91 and 95 are "false" spots having five consecutive visible spots (during five consecutive fields or approximately 5/60 seconds) and having two invisible spots between groups of five visible spots. Spot 93 is a "true" spot and similar to spots 91 and 95 except that the five visible spots are followed by three invisible (blanked) spots.

Figure 7:
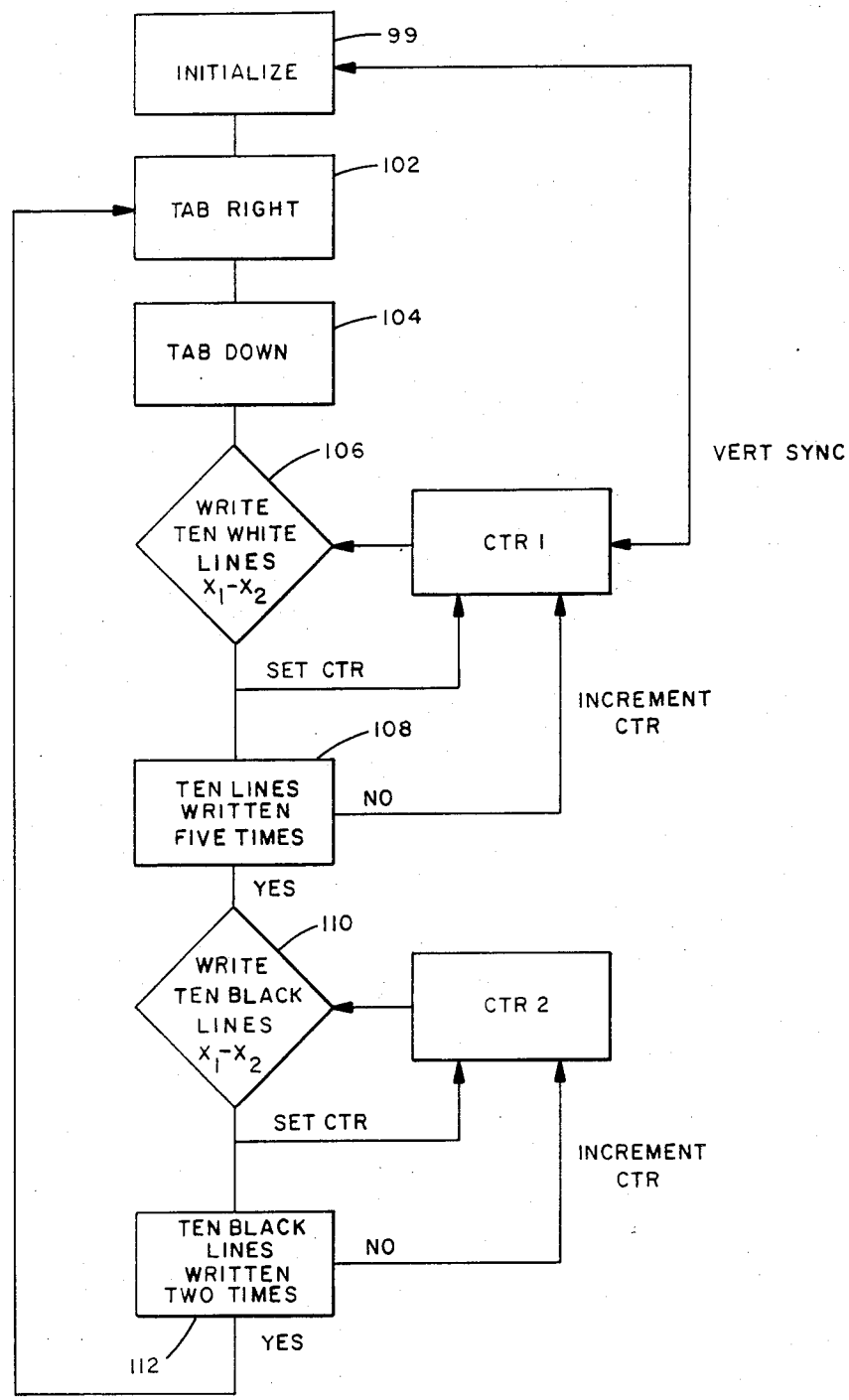
FIG. 7 is a flow chart illustrating one method for generating coded spots.

Referring now to the flow chart of FIG. 7, the program to write the spot 91 starts at step 99 at vertical sync, which can be derived from the internal vertical sync present in every personal computer driving a raster scan display (monitor). In step 102 of the program, the display TABS RIGHT to cause writing on the screen at the horizontal portion of the screen where the spots are to be displayed. At step 104, the program commands TAB DOWN to locate the beginning of the vertical position of spot 91.

Step 106 of the program then commands the writing of ten white line segments from $x_1$ to $x_2$ on the horizontal scan line to generate spot 91 and increments a counter (CTR 1). Step 108 commands that the writing of the ten white lines be repeated five times (once per field). When this is completed, step 110 is executed. This step causes black lines to be written to generate the invisible or blanked spots. At step 112, the writing of blank lines for two fields is executed.

The spots 93 and 95 are generated in like fashion except that at a step equivalent to step 112 for spot 93 the writing of black lines occurs for three fields. After generation of the three spots, the program returns to step 100 to regenerate the three spots. This is repeated for as long as it is desired to display the flashing spots.

While I have described above the principles of my invention in conjunction with specific apparatus, it is to be clearly understood that this description is made only by way of example and not as a limitation of the scope of my invention as set forth in the accompanying claims.

I claim:

1. A coded information system, comprising:
    a raster scan display having displayed on the screen thereof at least a first spot which is repetitively regenerated for a plurality of successive fields and blanked for a first predetermined number of successive fields between each regeneration for said plurality of fields, and at least a second spot which is repetitively regenerated for a plurality of successive fields and blanked for a second predetermined number of successive fields between each regeneration for said plurality of fields, said first and second spots being continuously generated for a plurality of sequences of spot regeneration and blanking periods; and
    an optical decoder operatively responsive to either of said first and second spots to denote whether said spot was blanked for said first or second predetermined number of fields.

2. The system of claim 1, wherein said optical decoder includes:
    an optical sensor for converting said displayed spots into electrical signals; and
    an electrical circuit coupled to said optical sensor for providing a first output responsive to said first spot and a second different output responsive to said second spot.

3. The system of claim 2, wherein said electrical circuit includes a delay circuit which will respond differently for electrical signals generated in response to said first spot and electrical signals generated in response to said second spot.

4. The system of claim 3, wherein said delay circuit includes a one-shot multivibrator having time constant which will cause the multivibrator to time out for electrical signals generated in response to said first spot and will not time out for electrical signals generated in response to said second spot.

5. The system of claim 3, wherein said electrical circuit includes an amplifier coupling said optical sensor to said delay circuit.

6. The system of claim 5, wherein said electrical circuit includes a pulse shaping circuit coupling said amplifier to said delay circuit.

7. The system of claim 2, further including means for providing a distinctive aural indication denoting whether said optical sensor received information from first or second spot.

8. The system of claim 2, further including means for providing a distinctive visual indication denoting whether said optical sensor received information from said first or second spot.

9. An optical decoder responsive to at least a first spot displayed on a raster scan display which is repetitively regenerated for a plurality of successive fields and blanked for a first predetermined number of successive fields between each regeneration for said plurality of fields, and at least a second displayed spot which is repetitively regenerated for a plurality of successive fields and blanked for a second predetermined number of successive fields between each regeneration for said plurality of fields, said first and second spots being continuously generated for a plurality of sequences of spot regeneration and blanking periods, comprising:
   an optical sensor; and
   an electrical circuit coupled to said optical sensor for providing a first output responsive to the first spot and a second different output responsive to the second spot.

10. An optical decoder as defined in claim 9, wherein said electrical circuit includes a delay circuit which will respond differently for electrical signals generated in response to the first spot and electrical signals generated in response to the second spot.

11. An optical decoder as defined in claim 10, wherein said delay circuit includes one-shot multivibrator having a time constant which will caus the multivibrator to time out for electrical signals generated in response to the first spot and will not time out for electrical signal generated in response to the second spot.

12. An optical decoder as defined in claim 10, wherein said electrical circuit includes an amplifier coupling said optical sensor to said delay circuit.

13. An optical decoder as defined in claim 12 wherein said electrical circuit includes a pulse shaping circuit coupling said amplifier to said delay circuit.

14. An optical decoder as defined in claim 9, further including means for providing a distinctive aural indication denoting whether said optical sensor received information from the first or second spot.

15. The optical decoder as defined in claim 1, further including means for providing a distinctive visual indication denoting whether said optical sensor received information from said firt or second spot.

16. A coded information system, comprising:
   a raster scan display having displayed on the screen thereof at least a first spot which is repetitively regenerated for a plurality of successive fields and blanked for a first predetermined number of successive fields between each regeneration for said plurality of fields, and at least a second spot which is repetitively regenerated for a plurality of successive fields and blanked for a second predetermined number of successive fields between each regeneration for said plurality of fields; and
   an optical decoder operatively responsive to either of said first and second spots to denote whether said spot was blanked for said first or second predetermined number of fields, said optical decoder including an optical sensor for converting said displayed spot into electrical signals and an electrical circuit coupled to said optical sensor for providing a first output responsive to said first spot and a second different output respective to said second spot, said electrical circuit including a delay circuit which will respond differently for electrical signals generated in response to said first spot and electrical signals generated in response to said second spot, said delay circuit including a one-shot multivibrator having a time constant which will cause the multivibrator to time out for electrical signals generated in response to said first spot and will not time out for electrical signals generated in response to said second spot.

17. A coded information system, comprising:
   a raster scan display having displayed on the screen thereof at least a first spot which is repetitively regenerated for a plurality of successive fields and blanked for a first predetermined number of successive fields between each regeneration for said plurality of fields, and at least a second spot which is repetitively regenerated for a plurality of successive fields and blanked for a second predetermined number of successive fields between each regeneration for said plurality of fields;
   an optical decoder operatively responsive to either of said first and second spots to denote whether said spot was blanked for said first or second predetermined number of fields, said optical decoder including an optical sensor for converting said displayed spots into electrical signals and an electrical circuit couled to said optical sensor for providing a first output responsive to said first spot and a second different output responsive to said second spot; and
   means for providing a distinctive aural indication denoting whether said optical sensor received information from said first or second spot.

18. An optical decoder responsive to at least a first spot displayed on a raster scan display which is repetitively regenerated for a plurality of successive fields and blanked for a first predetermined number of successive fields between each regeneration for said plurality of fields, and at least a second displayed spot which is repetitively regenerated for a plurality of successive fields and blanked for a second predetermined number of successive fields between each regeneration for said plurality of fields, comprising:
   an optical sensor; and
   an electrical circuit coupled to said optical sensor for providing a first output responsive to the first spot and a second different output responsive to the second spot, said electrical circuit including a delay circuit which will respond differently for electrical signals generated in response to the first spot and electrical signals generated in response to the second spot, said delay circuit including a one-shot multivibrator having a time constant which will cause the multivibrator to time out for electrical signals generated in response to the first spot and will not time out for electrical signals generated in response to the second spot.

19. An optical decoder responsive to at least a first spot displayed on a raster scan display which is repetitively regenerated for a plurality of successive fields and blanked for a first predetermined number of successive fields between each regeneration for said plurality of fields, and at least a second displayed spot which is repetitively regenerated for a plurality of successive fields and blanked for a second predetermined number of successive fields between each regeneration for said plurality of fields, comprising:

an optical sensor;

an electrical circuit coupled to said optical sensor for providing a first output responsive to the first spot and a second different output responsive to the second spot; and means for providing a distinctive aural indication denoting whether said optical sensor received information from said first or second spot.

* * * * *